United States Patent
Kaji et al.

(10) Patent No.: US 6,250,417 B1
(45) Date of Patent: Jun. 26, 2001

(54) POWER STEERING APPARATUS

(75) Inventors: Hiroaki Kaji, Yamatokooriyama; Masahiko Sakamaki, Yao, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/312,389

(22) Filed: May 14, 1999

(30) Foreign Application Priority Data

May 18, 1998 (JP) ................................................ 10-135754

(51) Int. Cl.[7] ...................................................... B62D 5/06
(52) U.S. Cl. ............................ 180/421; 180/422; 701/41; 701/42
(58) Field of Search .................................. 180/421, 422, 180/423; 701/41, 42

(56) References Cited

U.S. PATENT DOCUMENTS

| | | | |
|---|---|---|---|
| 5,404,960 | * | 4/1995 | Wada et al. .......................... 180/79.1 |
| 5,467,281 | * | 11/1995 | Iwashita et al. ................. 364/424.05 |
| 5,711,394 | * | 1/1998 | Fujii et al. ............................ 180/422 |
| 5,954,152 | * | 9/1999 | Kada et al. ........................... 180/422 |
| 5,995,890 | * | 11/1999 | Permuy .................................. 701/42 |
| 6,052,633 | * | 4/2000 | Fukuyama et al. .................... 701/41 |
| 6,069,460 | * | 5/2000 | Grabowski et al. ................. 318/434 |
| 6,092,012 | * | 7/2000 | Shimizu .................................. 701/41 |
| 6,092,618 | * | 7/2000 | Collier-Hallman .................. 180/422 |
| 6,122,579 | * | 9/2000 | Collier-Hallman .................... 701/41 |

FOREIGN PATENT DOCUMENTS 58-156457    9/1989    (JP) .

* cited by examiner

*Primary Examiner*—Brian L. Johnson
*Assistant Examiner*—Daniel Yeagley
(74) *Attorney, Agent, or Firm*—Darby & Darby

(57) ABSTRACT

This invention provides a power steering apparatus for assisting steering by utilizing a hydraulic pump to be driven by an electric motor as a generating source of a hydraulic pressure. A drive voltage determination unit determines a drive voltage so that a rotational velocity of the electric motor detected by a rotational velocity sensor and a rotational velocity detecting circuit becomes a first rotational velocity on the occasion of starting of the electric motor, and determines a gradually increasing drive voltage after the electric motor is started by the determined drive voltage until the detected rotational velocity reaches the second rotational velocity. Therefore, an unnecessary inrush current is not generated in the electric motor, and the rotational velocity of the electric motor does not overshoot.

6 Claims, 4 Drawing Sheets

POWER STEERING APPARATUS

BACKGROUND OF THE INVENTION

The present invention relates to a power steering apparatus for detecting a steering force to be applied to a steering wheel, and driving an electric motor so as to assist steering while using a hydraulic pump driven by the electric motor as a generating source of a hydraulic pressure when the detected steering force is larger than a predetermined value.

In a power steering apparatus which assists steering by using a hydraulic pump driven by an electric motor as a generating source of a hydraulic pressure, it is considered that when a steering wheel is not operated and a vehicle travels straight, the electric motor is terminated so that an electric power consumption is reduced.

FIG. 1 is a block diagram showing a configuration of such a power steering apparatus. In this power steering apparatus, a motor driving circuit 2 applies a voltage to an electric motor 4 according to a target value of an applied voltage (drive voltage) instructed by a drive voltage determination unit 1c so as to rotate the electric motor 4. The electric motor 4 drives a hydraulic pump 5 so as to discharging a hydraulic oil to a control valve 6 and generate a hydraulic pressure.

When a steering wheel 7 is operated and a gear apparatus (not shown) including a pinion gear 6c provided at a lower end of a steering wheel shaft is actuated, the control valve 6 controls a pressure of a hydraulic oil to be press-fed to pipe lines 6a and 6b connected with a hydraulic cylinder (not shown). As a result, the hydraulic cylinder is actuated, and a steering assisting force according to an operating amount is generated in an operating direction of the steering wheel 7.

The hydraulic oil circulates a hydraulic circuit composed of the hydraulic pump 5, control valve 6, hydraulic cylinder, a supply tank 5a and the like.

A rotational velocity sensor 4b for detecting a rotational velocity of the electric motor 4 is added to the electric motor 4, and a rotational velocity detection signal outputted by the rotational velocity sensor 4b is given to a rotational velocity detection circuit 4a so as to be converted into a rotational velocity signal and be given to a calculation circuit 1b.

The calculation circuit 1b subtracts the rotational velocity signal outputted by the rotational velocity detection circuit 4a from a rotational velocity instruction signal outputted by an instructing rotational velocity determination unit 3 so as to input the resultant into the drive voltage determination unit 1c. A rotational velocity of the electric motor 4 is set in the instructing rotational velocity determination unit 3 so that the hydraulic pump 5 can generate a hydraulic pressure which is required for the steering assistance.

The drive voltage determination unit 1c instructs the motor driving circuit 2 about an applied voltage by feedback control (PI control) based on a difference between the rotational velocity instruction signal outputted by the instructing rotational velocity determination unit 3 and the rotational velocity signal outputted by the rotational velocity detection circuit 4a.

Meanwhile, a steering force detector 7a composed of a torque sensor and the like for detecting a steering force applied to the steering wheel 7 is provided to the steering wheel shaft of the steering wheel 7, and a steering force signal outputted by the steering force detector 7a is given to a steering force detection circuit 7b. When the given steering force signal indicates a steering force which is larger than a predetermined steering force, the steering force detection circuit 7b turns on a power supply of the motor driving circuit 2. The motor driving circuit 2 whose power supply was turned on starts the electric motor 4 by the applied voltage instructed by the drive voltage determination unit 1c thereat.

In addition, on the contrary, when the given steering force signal indicates a steering force which is smaller than the predetermined steering force, the steering force detection circuit 7b turns off the power supply of the motor driving circuit 2.

Here, the similar technology to the above-mentioned power steering apparatus is disclosed in Japanese Patent Application Laid-Open No. 58-156457 (1983).

In the above-mentioned power steering apparatus, when the motor driving circuit 2 is turned on and the electric motor 4 is started by the applied voltage instructed from the drive voltage determination unit 1c thereat, as shown in FIG. 2, the rotational velocity of the electric motor 4 overshoots, and accordingly an unnecessary large inrush current is generated and unnecessary electric energy is consumed. Moreover, in some cases, the rotational velocity is not stabilized immediately.

BRIEF SUMMARY OF THE INVENTION

The present invention has been made with the aim of solving the above problems, and it is an object of the present invention to provide a power steering apparatus in which an unnecessary inrush current is not generated in an electric motor, an unnecessary electric energy can be reduced, a rotational velocity of the electric motor does not overshoot, and the rotation of the electric motor can immediately be controlled at a target (necessary) rotational velocity stable.

A power steering apparatus of the present invention for assisting steering by utilizing a hydraulic pump driven by an electric motor as a generating source of a hydraulic pressure, is characterized by including: a rotational velocity detector for detecting a rotational velocity of the electric motor; a first driving quantity determinator for determining a quantity of driving electricity such that the rotational velocity detected by the rotational velocity detector is to be a first rotational velocity, on the occasion of starting of the electric motor; and a second driving quantity determinator for determining a quantity of driving electricity, which gradually increases, after the electric motor is started by the quantity of driving electricity determined by the first driving quantity determinator, until the rotational velocity detected by the rotational velocity detector reaches a second rotational velocity, wherein the electric motor is driven by the quantity of driving electricity determined by the first and second driving quantity determinators.

In this power steering apparatus, the hydraulic pump driven by the electric motor is utilized as a generating source of a hydraulic pressure so that the steering is assisted, and the rotational velocity detector detects the rotational velocity of the electric motor. On the occasion of starting of the electric motor, the first driving quantity determinator determines a quantity of driving electricity so that the rotational velocity is to be the first rotational velocity. After the electric motor is started by the quantity of driving electricity determined by the first driving quantity determinator, the second driving quantity determinator determines a gradually increasing quantity of driving electricity until the rotational velocity detected by the rotational velocity detector reaches the second rotational velocity, while the electric motor is driven by the determined quantities of driving electricity.

Another power steering apparatus of the present invention for driving a hydraulic pump which generates a hydraulic pressure for steering assistance by an electric motor is characterized by including: a rotational velocity detector for detecting a rotational velocity of the electric motor; and a driving quantity determinator for determining a quantity of driving electricity of the electric motor based on the rotational velocity detected by the rotational velocity detector, wherein the driving quantity determinator determines the quantity of driving electricity so that the rotational velocity becomes a first rotational velocity on the occasion of starting of the electric motor, and the driving quantity determinator gradually increases the quantity of driving electricity after the electric motor is started by the quantity of driving electricity until the rotational velocity detected by the rotational velocity detector reaches a second rotational velocity.

In this power steering apparatus, the hydraulic pump for generating a hydraulic pressure for steering assistance is driven by the electric motor, and the rotational velocity detector detects the rotational velocity of the electric motor. On the occasion of starting of the electric motor, the driving quantity determinator determines a quantity of driving electricity so that the rotational velocity becomes the first rotational velocity, and the driving quantity determinator determines the quantity of driving electricity so that it increases gradually after the electric motor is started by the determined quantity of driving electricity until the rotational velocity detected by the rotational velocity detector reaches the second rotational velocity.

Therefore, the power steering apparatus, in which an unnecessary inrush current is not generated in the electric motor, an unnecessary electric energy can be reduced, moreover, the rotational velocity of the electric motor does not overshoot, and which can immediately control the stable rotation of the electric motor at a target (necessary) rotational speed, can be realized.

In addition, in the case where resolution of the rotational velocity detector of the electric motor is low, a detection period of the rotational velocity becomes long, and when the electric motor is started by feedback control, the rotational velocity of the electric motor overshoots. However, in this power steering apparatus, since the overshooting does not occur, the electric motor can be started smoothly without raising the resolution of the rotational velocity detector.

Another power steering apparatus of the present invention is characterized in that at least either driving quantity determinator determines a quantity of driving electricity based on the rotational velocity which is detected by the rotational velocity detector and is fed back after the rotational velocity reaches the second rotational velocity.

In this power steering apparatus, the steering is assisted by utilizing the hydraulic pump driven by the electric motor as a generating source of the hydraulic pressure, and the rotational velocity detector detects the rotational velocity of the electric motor. On the occasion of starting of the electric motor, the first driving quantity determinator determines the quantity of driving electricity for allowing the rotational velocity to reach the first rotational velocity, and after the electric motor is started by the quantity of driving electricity determined by the first driving quantity determinator, the second driving quantity determinator determines a gradually increasing quantity of driving electricity until the rotational velocity reaches the second rotational velocity so that the electric motor is driven by the respective determined quantities of driving electricity. After the rotational velocity reaches the second rotational velocity, at least either driving quantity determinator determines a quantity of driving electricity based on the rotational velocity which is detected by the rotational velocity detector and is fed back.

Therefore, the power steering apparatus, in which an unnecessary inrush current is not generated in the electric motor, an unnecessary electric energy can be reduced, moreover, the rotational velocity of the electric motor does not overshoot, and which can immediately control the stable rotation of the electric motor at a target (necessary) rotational speed, can be realized.

In addition, in the case where resolution of the rotational velocity detector of the electric motor is low, a detection period of the rotational velocity becomes long, and when the electric motor is started by the feedback control, the rotational velocity of the electric motor overshoots. However, in this power steering apparatus, since the overshooting does not occur, the electric motor can be started smoothly without raising the resolution of the rotational velocity detector.

Another power steering apparatus of the present invention is characterized by further comprising a third driving quantity determinator for determining a quantity of driving electricity based on the rotational velocity which is detected by the rotational velocity detector and is fed back after the rotational velocity reaches the second rotational velocity.

In this power steering apparatus, the steering is assisted by utilizing the hydraulic pump driven by the electric motor as a generating source of a hydraulic pressure, and the rotational velocity detector detects the rotational velocity of the electric motor. On the occasion of starting of the electric motor, the first driving quantity determinator determines a quantity of driving electricity which allows the rotational velocity to be the first rotational velocity, and after the electric motor is started by the quantity of driving electricity determined by the first driving quantity determinator, the second driving quantity determinator determines a gradually increasing quantity of driving electricity until the rotational velocity reaches the second rotational velocity so that the electric motor is driven by the respective determined quantities of driving electricity. After the rotational velocity reaches the second rotational velocity, the third driving quantity determinator determines a quantity of driving electricity based on the rotational velocity which is detected by the rotational velocity detector and is fed back.

Still another power steering apparatus of the present invention is characterized in that the driving quantity determinator determines a quantity of driving electricity based on the rotational velocity which is detected by the rotational velocity detector and is fed back after the rotational velocity reaches the second rotational velocity.

In this power steering apparatus, the hydraulic pump which generates a hydraulic pressure for steering assistance is driven by the electric motor, and the rotational velocity detector detects the rotational velocity of the electric motor. On the occasion of starting of the electric motor, the driving quantity determinator determines the quantity of driving electricity which allows the rotational velocity to be the first rotational velocity, and after the electric motor is started by the determined quantity of driving electricity, the driving quantity determinator determines a gradually increasing quantity of driving electricity until the rotational velocity reaches the second rotational velocity so that the electric motor is driven by the respective determined quantities of driving electricity. After the rotational velocity reaches the second rotational velocity, the driving quantity determinator determines a quantity of driving electricity based on the rotational velocity of the electric motor which is detected by the rotational velocity detector and is fed back.

Therefore, the power steering apparatus, in which an unnecessary inrush current is not generated in the electric motor, an unnecessary electric energy can be reduced, moreover, the rotational velocity of the electric motor does not overshoot, and which can immediately control the stable rotation of the electric motor at a target (necessary) rotational speed, can be realized.

In addition, in the case where resolution of the rotational velocity detector of the electric motor is low, a detection period of the rotational velocity becomes long, and when the electric motor is started by the feedback control, the rotational velocity of the electric motor overshoots. However, in this power steering apparatus, since the overshooting does not occur, the electric motor can be started smoothly without raising the resolution of the rotational velocity detector.

The above and further objects and features of the invention will more fully be apparent from the following detailed description with accompanying drawings.

DETAILED DESCRIPTION OF THE INVENTION

Figure 1:
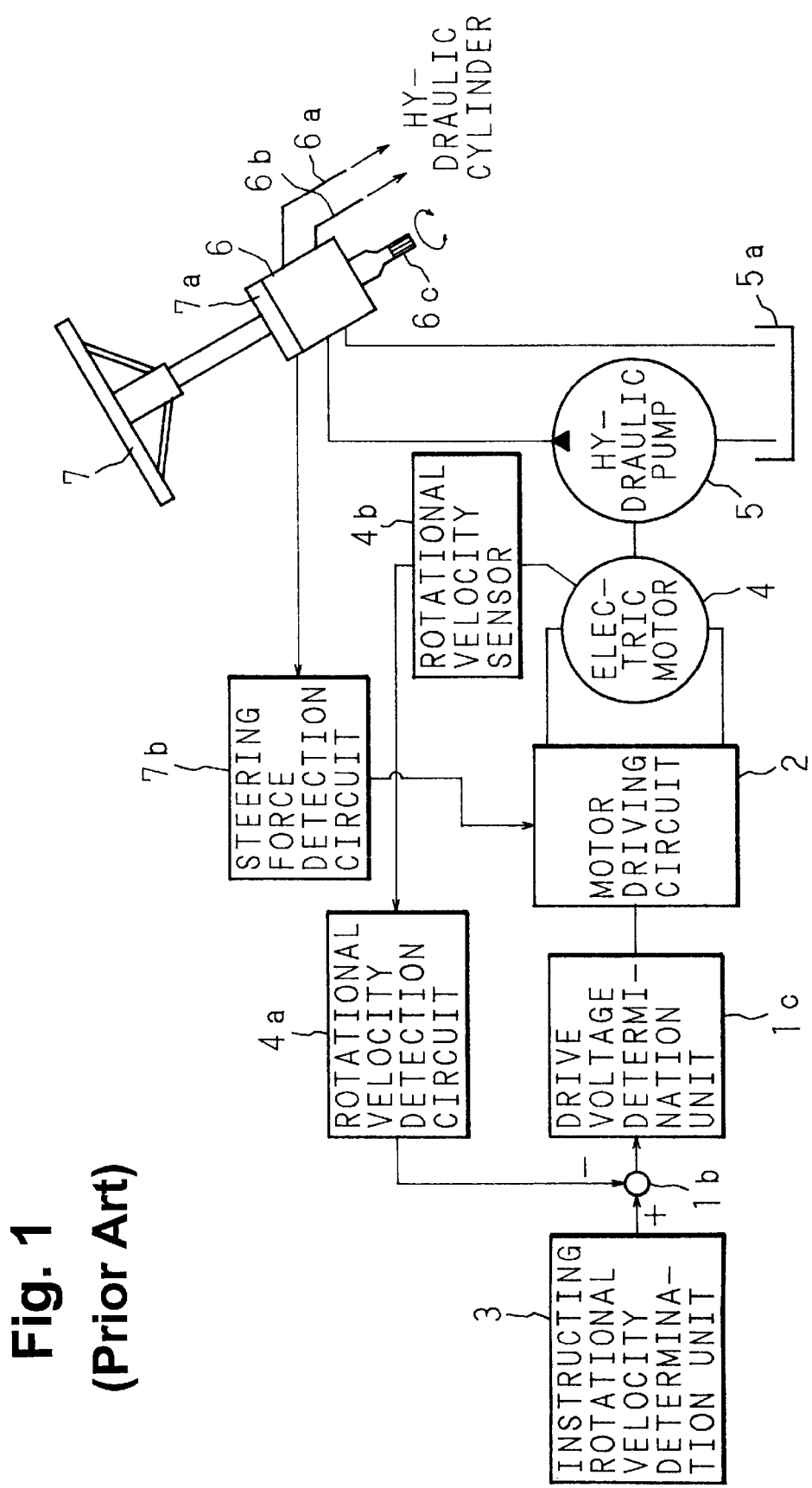
FIG. 1 is a block diagram showing a constitutional example of an essential part of a conventional power steering apparatus.
Figure 2:
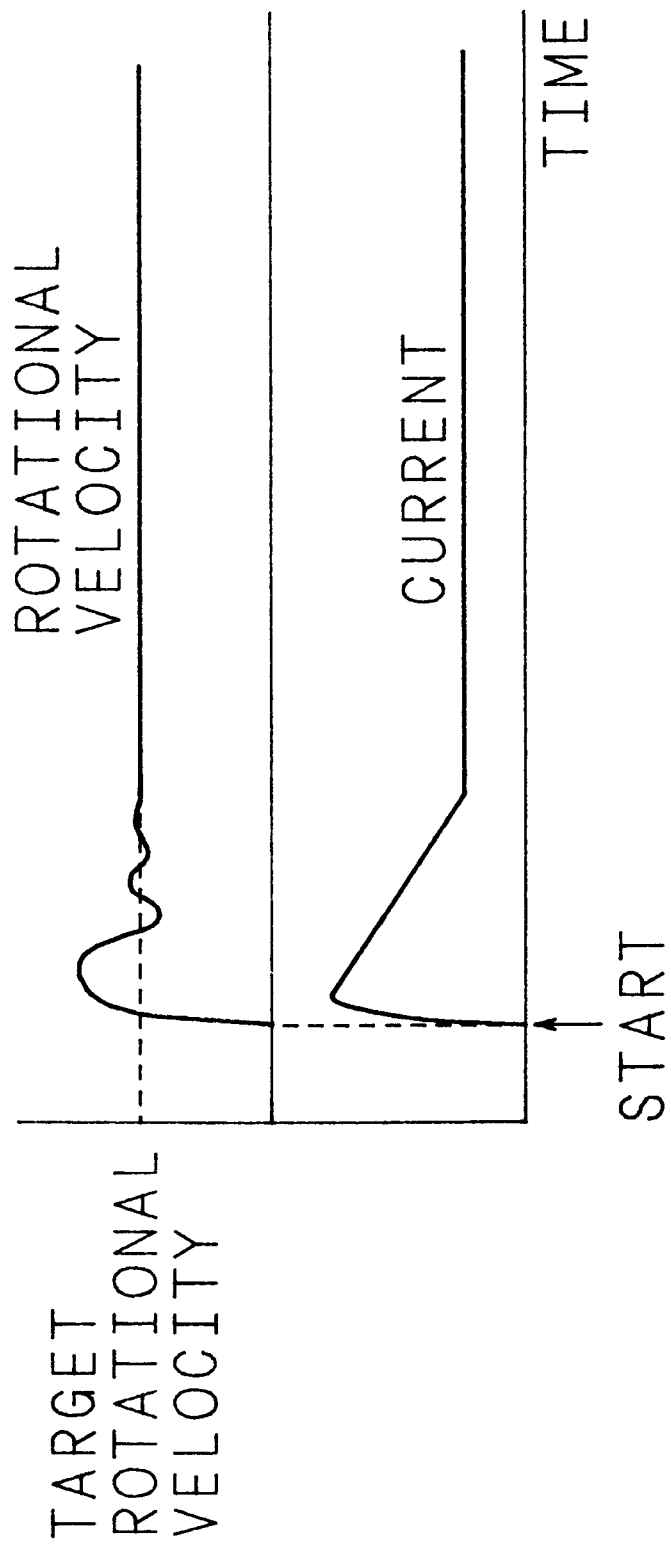
FIG. 2 is a timing chart showing an operation of the conventional power steering apparatus.
Figure 3:
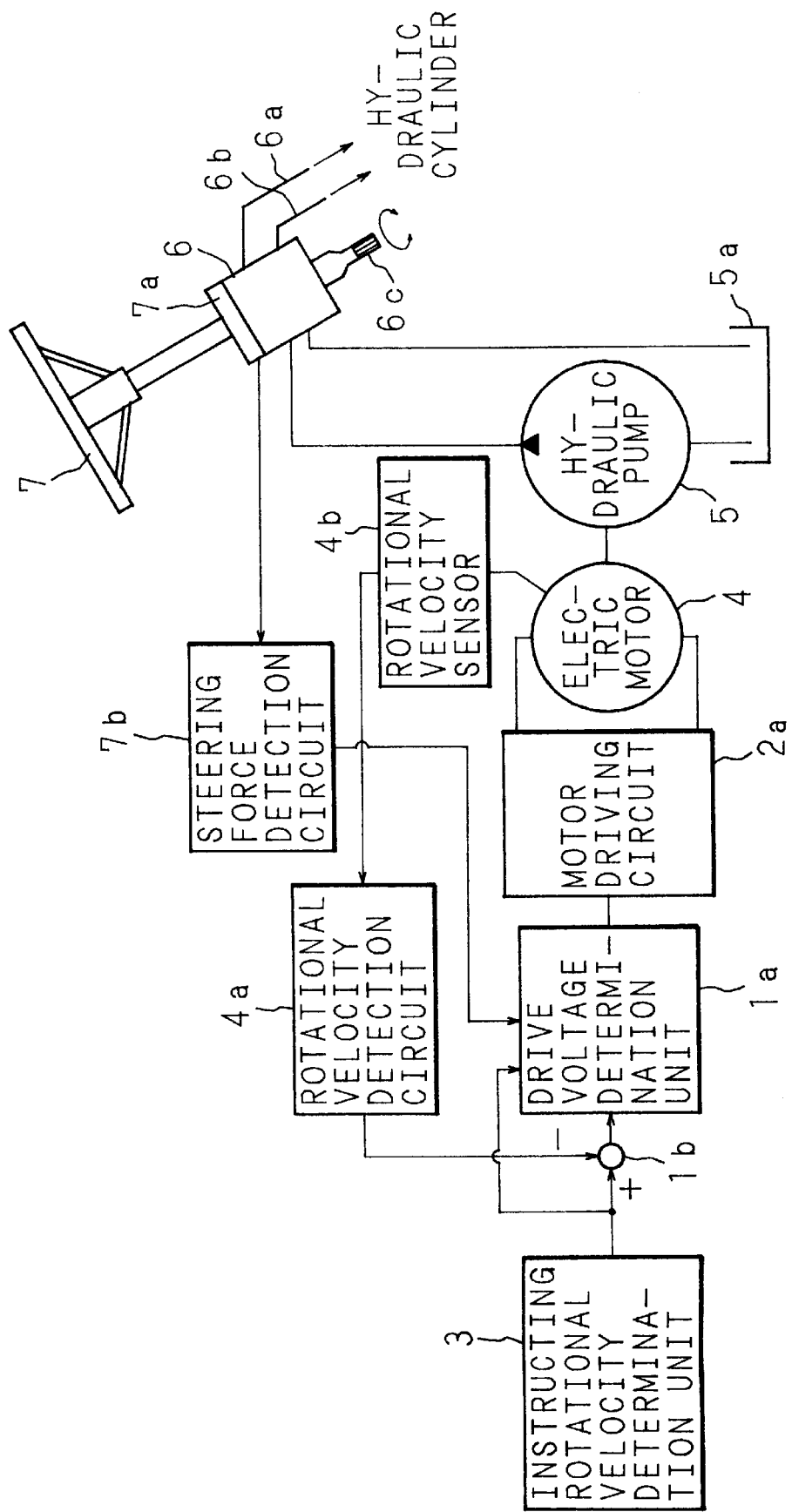
FIG. 3 is a block diagram showing a constitution of an essential part of a power steering apparatus according to an embodiment of the present invention.

The present invention will now be described in detail referring to the accompanying drawings illustrating the embodiment thereof. FIG. 3 is a block diagram showing a constitution of a power steering apparatus according to an embodiment of the present invention. In this power steering apparatus, a motor driving circuit 2a applies a voltage to an electric motor 4 so as to rotate the electric motor 4 according to a driving voltage instructed by a drive voltage determination unit 1a (first through third driving quantity determinators). The electric motor 4 drives a hydraulic pump 5 so as to discharge a hydraulic oil to a control valve 6 and generate a hydraulic pressure.

When a steering wheel 7 is operated and a gear apparatus (not shown) including a pinion gear 6c provided at a lower end of a steering wheel shaft is actuated, the control valve 6 controls a pressure of a hydraulic oil press-fed to pipe lines 6a and 6b connected with a hydraulic cylinder (not shown). As a result, the hydraulic cylinder is actuated, and a steering assisting force according to an operating amount is generated in an operating direction of the steering wheel 7.

The hydraulic oil circulates a hydraulic circuit composed of the hydraulic pump 5, control valve 6, hydraulic cylinder, a supply tank 5a and the like.

A rotational velocity sensor 4b (rotational velocity detector) for detecting a rotational velocity of the electric motor 4 is added to the electric motor 4, and a rotational velocity detection signal outputted by the rotational velocity sensor 4b is given to a rotational velocity detection circuit 4a (rotational velocity detector) so as to be converted into a rotational velocity signal and be given to a calculation circuit 1b.

The calculation circuit 1b subtracts the rotational velocity signal outputted by the rotational velocity detection circuit 4a from a rotational velocity instruction signal outputted by an instructing rotational velocity determination unit 3 so as to input the signal to a drive voltage determination unit 1a. A target rotational velocity (second rotational velocity) of the electric motor 4 is set in the instructing rotational velocity determination unit 3 so that the hydraulic pump 5 can generate a hydraulic pressure required for steering assistance.

Meanwhile, a steering force detector 7a composed of a torque sensor and the like for detecting a steering force applied to the steering wheel 7 is provided to the steering wheel shaft of the steering wheel 7, and a steering force signal outputted by the steering force detector 7a is given to a steering force detection circuit 7b. When the given steering force signal indicates a steering force which is larger than a predetermined steering force, the steering force detection circuit 7b gives a signal for starting the electric motor 4 to the drive voltage determination unit 1a. Moreover, on the contrary, when the given steering force signal indicates a steering force which is lower than the predetermined steering force, the steering force detection circuit 7b gives a signal for stopping the electric motor 4 to the drive voltage determination unit 1a.

When the signal for starting the electric motor 4 is given from the steering force detection circuit 7b to the drive voltage determination unit 1a and the electric motor 4 is started, the drive voltage determination unit 1a determines a drive voltage according to a rotational velocity (first rotational velocity) so that a rotational velocity does not overshoot and does not securely exceed a target rotational velocity instructed by the instructing rotational velocity determination unit 3, and gives the drive voltage to the motor driving circuit 2a.

In addition, after the electric motor 4 is started by a drive voltage according to the rotational velocity (first rotational velocity) which does not securely exceed a target rotational velocity, the drive voltage determination unit 1a determines a gradually increasing drive voltage and gives it to the motor driving circuit 2a until the rotational velocity reaches a target rotational velocity instructed by the instructing rotational velocity determination unit 3.

After the rotational velocity detected by the rotational velocity sensor 4b reaches the target rotational velocity instructed by the instructing rotational velocity determination unit 3, the drive voltage determination unit 1a instructs the motor driving circuit 2a about a drive voltage through feedback control (PI control) based on a difference between a rotational velocity instruction signal outputted by the instructing rotational velocity determination unit 3 and a rotational velocity signal outputted by the rotational velocity detection circuit 4a.

Figure 4:
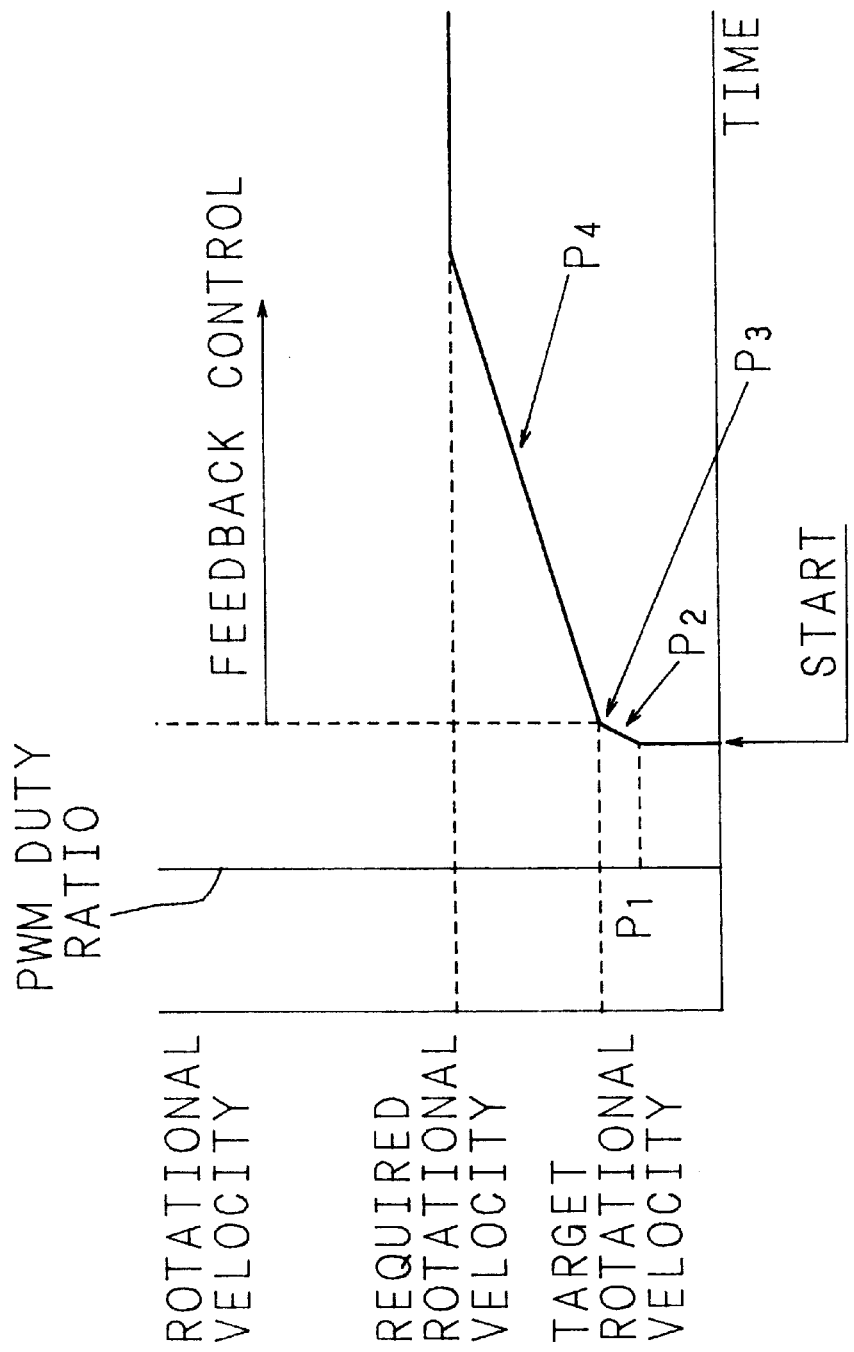
FIG. 4 is a timing chart showing an operation of the power steering apparatus of the present invention.

The following will describe an operation of the power steering apparatus having such a configuration with reference to a timing chart of FIG. 4.

FIG. 4 is a timing chart showing the operation of the power steering apparatus of the present invention. In this power steering apparatus, when the steering wheel 7 is not operated and the steering force signal outputted by the steering force detector 7a is smaller than a predetermined value and a steering assisting force is not required, the drive voltage determination unit 1a stops the electric motor 4 so as to suppress an energy consumption amount.

Meanwhile, when the steering wheel 7 is operated and the steering force signal outputted by the steering force detector 7a becomes larger than the predetermined value, the steering force detection circuit 7b gives a signal for starting the electric motor 4 to the drive voltage determination unit 1a.

At this time, as shown in FIG. 4, the drive voltage determination unit 1a determines a drive voltage (PWM duty ratio) according to the rotational velocity (FIG. 4: P1) which does not securely overshot nor exceed the target rotational velocity instructed by the instructing rotational velocity determination unit 3, and execute open loop control such that the instruction signal is given to the motor driving circuit 2a. The motor driving circuit 2a applies a drive voltage according to the given instruction signal to the electric motor 4 so as to start the electric motor 4 (FIG. 4: P1).

After the electric motor 4 is started, the drive voltage determination unit 1a determines a gradually increasing drive voltage (FIG. 4: P2) until the rotational velocity reaches the target rotational velocity instructed by the instructing rotational velocity determination unit 3, and executes the open loop control so that the instruction signal is given to the motor driving circuit 2a. The motor driving circuit 2a applies the gradually increasing drive voltage according to the given instruction signal to the electric motor 4 so as to gradually raise the rotational velocity.

After the rotational velocity of the electric motor 4 rises and the rotational velocity detected by the rotational velocity sensor 4b reaches the target rotational velocity instructed by the instructing rotational velocity determination unit 3 (FIG. 4: P3), the drive voltage determination unit 1a determines a drive voltage through the feedback control (PI control) based on the difference between the rotational velocity instruction signal outputted by the instructing rotational velocity determination unit 3 and the rotational velocity signal outputted by the rotational velocity detection circuit 4a, and gives the instruction signal to the motor driving circuit 2a.

In addition, after the rotational velocity detected by the rotational velocity sensor 4b reaches the target rotational velocity instructed by the instructing rotational velocity determination unit 3 (FIG. 4: P3), the drive voltage determination unit 1a raises/lowers the drive voltage through the feedback control as the need arises so as to give the instruction signal to the motor driving circuit 2a. The motor driving circuit 2a applies the drive voltage according to the given instruction signal to the electric motor 4 so as to raise/lower the rotational velocity to an necessary rotational velocity (FIG. 4: P4).

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A power steering apparatus, comprising:
   an electric motor;
   a hydraulic pump for being driven by said electric motor and generating a hydraulic pressure for steering assistance;
   a rotational velocity detector for detecting a rotational velocity of said electric motor;
   a first driving quantity determinator for determining a quantity of driving electricity such that the rotational velocity is to be a first rotational velocity, on the occasion of starting of the electric motor; and
   a second driving quantity determinator for determining a quantity of driving electricity, which gradually increases, after said electric motor is started by the quantity of driving electricity determined by said first driving quantity determinator until the rotational velocity detected by said rotational velocity detector reaches a second rotational velocity,
   wherein said electric motor is driven by the quantity of driving electricity determined by said first and second driving quantity determinators.

2. The power steering apparatus according to claim 1, wherein at least either driving quantity determinator determines a quantity of driving electricity based on the rotational velocity which is detected by said rotational velocity detector and is fed back, after the rotational velocity reaches the second rotational velocity.

3. The power steering apparatus according to claim 1, further comprising: a third driving quantity determinator for determining a quantity of driving electricity based on the rotational velocity which is detected by said rotational velocity detector and is fed back, after the rotational velocity reaches the second rotational velocity.

4. A power steering apparatus, comprising:
   a hydraulic pump generating hydraulic pressure for steering assistance;
   an electric motor driving said hydraulic pump;
   a rotational velocity detector detecting rotational velocity of said electric motor; and
   a driving quantity determinator controlling a quantity of driving electricity to said electric motor so that upon starting said electric motor the rotational velocity of said electric motor reaches a first target rotational velocity, and so that
   said driving quantity determinator gradually increases the quantity of driving electricity to said electric motor after starting said electric motor based upon the rotational velocity of said electric motor detected by said rotational velocity detector until a second rotational velocity is reached.

5. A power steering apparatus, comprising:
   a hydraulic pump generating a hydraulic pressure for steering assistance;
   an electric motor driving said hydraulic pump;
   a rotational velocity detector detecting a rotational velocity of said electric motor; and
   a driving quantity determinator determining a quantity of driving electricity to said electric motor so that upon starting said electric motor the rotational velocity of said electric motor reaches a first target rotational velocity, and so that
   said driving quantity determinator gradually increases the quantity of driving electricity to said electric motor after starting said electric motor based upon the rotational velocity of said electric motor detected by said rotational velocity detector until a second rotational velocity is reached,
   wherein said driving quantity determinator is fed back, after the rotational velocity reaches the second rotational velocity.

6. A power steering apparatus, comprising:
   a hydraulic pump generating hydraulic pressure for steering assistance;

an electric motor driving said hydraulic pump;

a rotational velocity detector detecting rotational velocity of said electric motor; and a driving quantity determinator controlling a quantity of driving electricity to said electric motor such that upon starting said electric motor the rotational velocity of said electric motor reaches a first target rotational velocity, said driving quantity determinator gradually increasing the quantity of driving electricity to said electric motor by open loop control after starting said electric motor, based upon the rotational velocity of said electric motor detected by said rotational velocity detector so that said motor reaches a second rotational velocity.

* * * * *

UNITED STATES PATENT AND TRADEMARK OFFICE
CERTIFICATE OF CORRECTION

PATENT NO.    : 6,250,417 B1                                                Page 1 of 1
DATED         : June 26, 2001
INVENTOR(S)   : Hiroaki Kaji and Masakiko Sakamaki It is certified that error appears in the above-identified patent and that said Letters Patent is hereby corrected as shown below:

<u>Title page,</u>
Item [75] Inventor, change "Yao" to -- Yao-Shi --

Signed and Sealed this

Fourteenth Day of May, 2002

*Attest:*

JAMES E. ROGAN
*Attesting Officer*    *Director of the United States Patent and Trademark Office*